United States Patent
Chen

(10) Patent No.: US 12,160,538 B2
(45) Date of Patent: Dec. 3, 2024

(54) GIMBAL

(71) Applicant: HOHEM TECHNOLOGY CO., LTD., Guangdong (CN)

(72) Inventor: Min Chen, Shenzhen (CN)

(73) Assignee: HOHEM TECHNOLOGY CO., LTD., Shenzhen (CN)

(*) Notice: Subject to any disclaimer, the term of this patent is extended or adjusted under 35 U.S.C. 154(b) by 483 days.

(21) Appl. No.: 17/639,097

(22) PCT Filed: Dec. 2, 2019

(86) PCT No.: PCT/CN2019/122424
§ 371 (c)(1),
(2) Date: Feb. 28, 2022

(87) PCT Pub. No.: WO2021/036069
PCT Pub. Date: Mar. 4, 2021

(65) Prior Publication Data
US 2022/0303375 A1 Sep. 22, 2022

(30) Foreign Application Priority Data
Aug. 30, 2019 (CN) .......................... 201910817431.X

(51) Int. Cl.
*H04M 1/04* (2006.01)
*F16M 11/04* (2006.01)
(Continued)

(52) U.S. Cl.
CPC ............ *H04M 1/04* (2013.01); *F16M 11/041* (2013.01); *F16M 11/105* (2013.01);
(Continued)

(58) Field of Classification Search
CPC .. A47G 23/02; A45F 5/00; B62J 9/27; H04M 1/04; G03B 17/56; G03B 15/00
See application file for complete search history.

(56) References Cited

U.S. PATENT DOCUMENTS

D857,786 S * 8/2019 Kim .............................. D14/217
2018/0106422 A1 4/2018 Saika et al.

FOREIGN PATENT DOCUMENTS

CN         105937697 A     9/2016
CN         207179130 U     4/2018
(Continued)

OTHER PUBLICATIONS

Patent Cooperation Treaty: International Search Report and Written Opinion of PCT/CN2019/122424; Jun. 2, 2020; 12 pages.

*Primary Examiner* — Tu X Nguyen

(57) ABSTRACT

A gimbal includes a handle (300), a first arm (100), a second arm (200) and a clamping member (400) sequentially connected, the second arm (200) including a second connecting portion (210) and a second rod portion (211); and further includes: a first driving member (11) connected to the handle (300) and the first arm (100) to drive the first arm (100) to rotate with respect to the handle (300); a second driving member (12) connected to the second connecting portion (210) and the second rod portion (211) in the second arm (200) to drive the second rod portion (211) to rotate with respect to the second connecting portion (210); and a third driving member (13) connected to the second rod portion (211) and the clamping member (400) to drive the clamping member (400) to rotate with respect to the second rod portion (211).

20 Claims, 16 Drawing Sheets

(51) Int. Cl.
*F16M 11/10* (2006.01)
*F16M 11/18* (2006.01)
*F16M 11/20* (2006.01)
*F16M 13/04* (2006.01)
*G03B 17/56* (2021.01)

(52) U.S. Cl.
CPC ......... *F16M 11/18* (2013.01); *F16M 11/2064* (2013.01); *F16M 13/04* (2013.01); *G03B 17/561* (2013.01)

(56) References Cited

FOREIGN PATENT DOCUMENTS

| | | |
|---|---|---|
| CN | 208253098 U | 12/2018 |
| CN | 208295451 U | 12/2018 |
| CN | 110430305 A | 11/2019 |

\* cited by examiner

GIMBAL

CROSS-REFERENCE TO RELATED APPLICATIONS

This application is a U.S. National Phase application submitted under 35 U.S.C. § 371 of Patent Cooperation Treaty application serial no. PCT/CN2019/122424, filed on Dec. 2, 2019, and entitled GIMBAL, which application claims priority to Chinese patent application serial no. 201910817431X, filed on Aug. 30, 2019, and entitled FOLDABLE GIMBAL. Patent Cooperation Treaty application serial no. PCT/CN2019/122424, published as WO2021/036069, and Chinese patent application serial no. 201910817431X, are incorporated herein by reference.

TECHNICAL FIELD

The present disclosure relates to the field of gimbal technologies, and in particular, to a gimbal.

BACKGROUND

With the powerful functions of mobile phones, more and more people take photos through mobile phones.

When a mobile phone is held for shooting, shaking of a hand may lead to shaking of a picture taken by the mobile phone, which reduces the shooting quality. On this basis, a gimbal emerges, which is a mobile phone carrier and similar to a selfie stick, and operates by clamping a mobile phone. When the gimbal operates, a motion opposite to hand movement may be produced, so as to ensure that the mobile phone is relatively stable during the shooting and the shot picture is stable without shaking.

However, a conventional gimbal is of a large size and inconvenient to carry. How to improve the portability of the gimbal is a technical problem to be urgently solved in the art.

SUMMARY

Based on the above, there is a need to provide a gimbal with respect to the above technical problem.

A gimbal, including a handle, a first arm, a second arm and a clamping member sequentially connected, the second arm including a second connecting portion and a second rod portion; and further including:
- a first driving member connected to the handle and the first arm to drive the first arm to rotate with respect to the handle;
- a second driving member connected to the second connecting portion and the second rod portion in the second arm to drive the second rod portion to rotate with respect to the second connecting portion; and
- a third driving member connected to the second rod portion and the clamping member to drive the clamping member to rotate with respect to the second rod portion;
- wherein the second connecting portion is rotatably connected to the first arm so that the gimbal is foldable or unfoldable, and after the gimbal is folded, the second driving member, the third driving member and the first driving member are sequentially arranged along an axis direction of the handle.

Details of one or more embodiments of the present disclosure are set forth in the following accompanying drawings and descriptions. Other features, objectives, and advantages of the present disclosure become obvious with reference to the specification, the accompanying drawings, and the claims.

Figure 1:
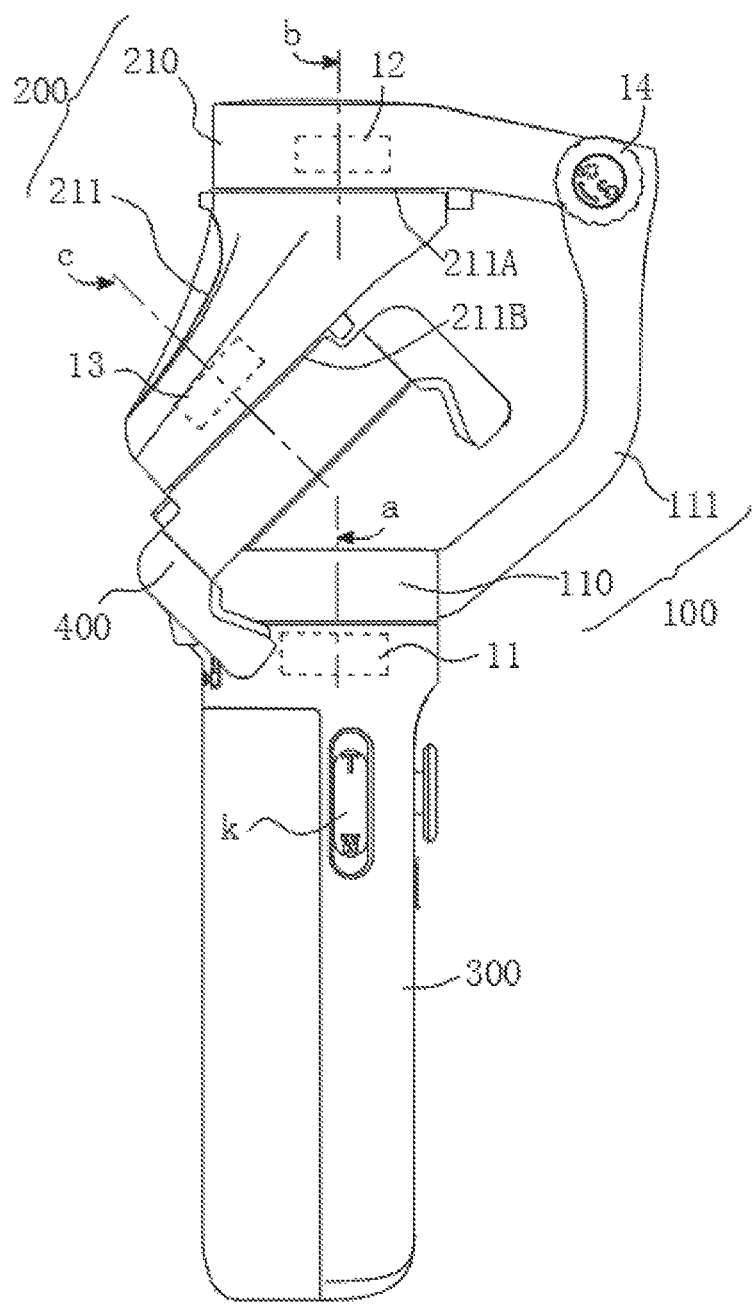
FIG. 1 is a front view of a gimbal after folding according to a first embodiment of the present application.

Reference numerals: a: first rotating shaft; b: second rotating shaft; c: third rotating shaft; 11: first driving member; 12: second driving member; 13: third driving member; 11A: first shaft; 12A: second shaft; 13A: third shaft; 14: threaded member; 100: first arm; 100A: first connecting portion; 100B: first rod portion; 110: first connecting portion; 111: first rod portion; 200: second arm; 200A: second connecting portion; 200B: second rod portion; 210: second connecting portion; 210A: hinged portion; 210B: through hole; 210C: projection; 211: second rod portion; 211A: first end surface; 211B: second end surface; 300: handle; 400: clamping member; 410: first slot; 410A: first clamp finger; 420: second slot; 420A: second clamp finger; 430: support seat; 440: first movable seat; 450: second movable seat; 460: elastic member; 470: clip slot; 510: first engaging portion; 520: second engaging portion; 510A: first driving member; 520A: second driving member; 530A: third driving member; 610: first engaging portion; 610A: first groove surface; 610B: second groove surface; 620: second engaging portion; 620A: first sidewall; 620B: second sidewall; 620C: slot; 620D: opening; 620E: stop portion; 620F: concave portion; 630: third engaging portion; 630A: convex portion; 700: locking member; 810: first locking component; 810A: first locking pin; 810B: first locking seat; 820: second locking component; 820A: second locking pin; 820B: second locking seat; 830: third locking component; 830A: third locking pin; 830B: third locking seat.

DETAILED DESCRIPTION OF THE EMBODIMENTS

For easy understanding of the present disclosure, a more comprehensive description of the present disclosure is given below with reference to the accompanying drawings. Preferred embodiments of the present disclosure are given in the accompanying drawings. However, the present disclosure may be implemented in many different forms and is not limited to the embodiments described herein. On the contrary, these embodiments are provided to understand the disclosed content of the present disclosure more thoroughly and comprehensively.

It is to be noted that, when one element is referred to as "fixed to" another element, it may be directly arranged on the other element or an intermediate element may exist. When one element is considered to be "connected to" another element, it may be directly connected to the other element or an intermediate element may co-exist. Conversely, when one element is referred to as "directly on" another element, no intermediate element exists. The terms "vertical", "horizontal", "left", "right" and similar expressions used herein are for illustrative purposes only.

Figure 2:
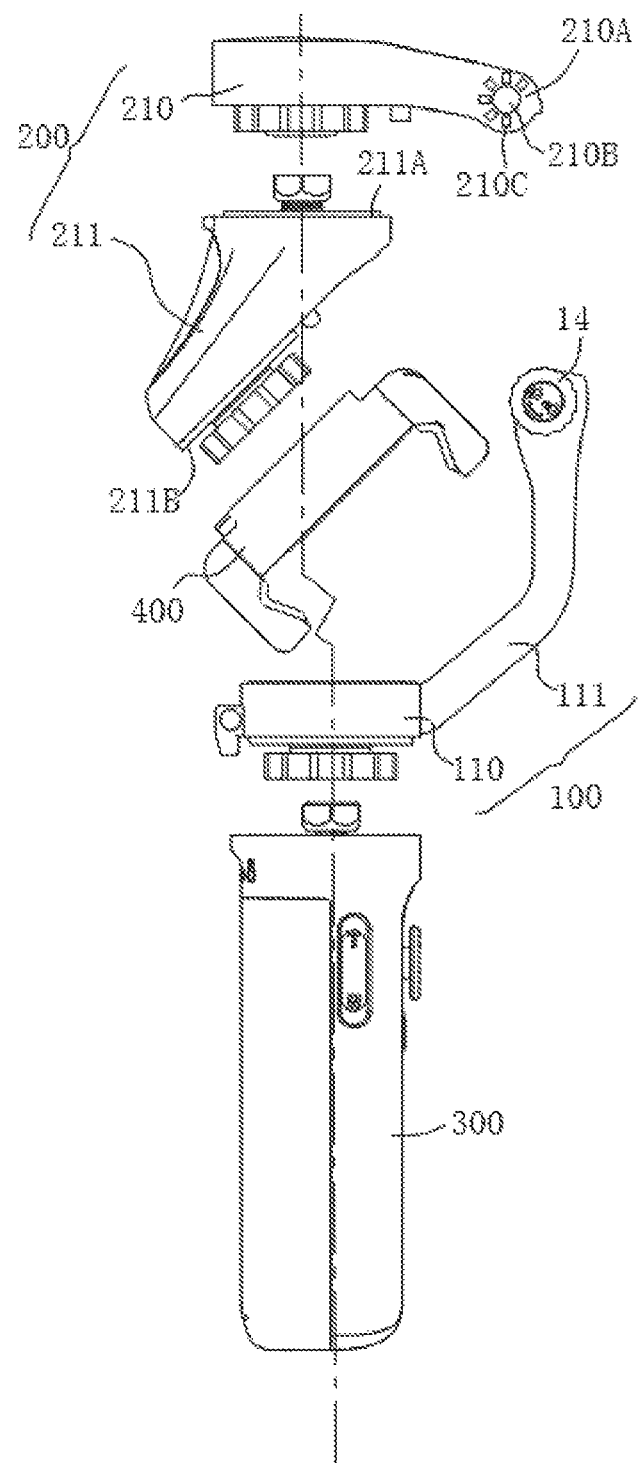
FIG. 2 is an exploded view of the gimbal in FIG. 1.
Figure 3:
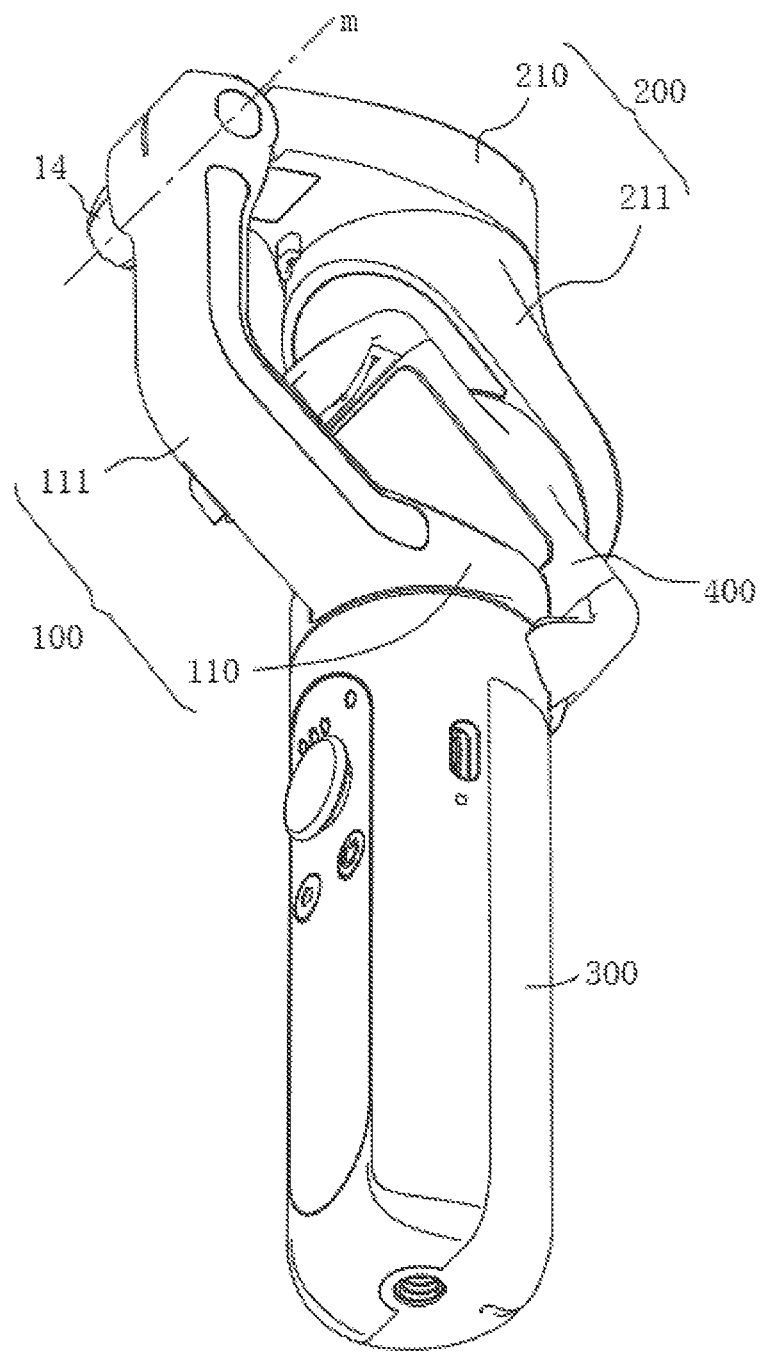
FIG. 3 is a three-dimensional view of the gimbal in FIG. 1.

FIG. 1 is a front view of a gimbal after folding according to a first embodiment. FIG. 2 is an exploded view of the gimbal in FIG. 1. FIG. 3 is a three-dimensional view of the gimbal in FIG. 1.

As shown in FIG. 1 to FIG. 3, the gimbal includes a handle 300. In one use scenario, the handle 300 may be used as a gripping portion. That is, a person holds the handle 300 to grip the gimbal. In another use scenario, the handle 300 may be supported by a support base. The gimbal is supported through the support base. The base may be placed on a vehicle and other places where shooting environments are required to be stabilized.

The gimbal may clamp a mobile phone. The gimbal includes three driving members, that is, a first driving member 11, a second driving member 12 and a third driving member 13. After the gimbal is unfolded, the three driving members are arranged in a three-dimensional space, so that the mobile phone may move in the three-dimensional space. For example, when the gripped handle 300 is offset, a sensor in the gimbal can sense an offset angle, then a correction motion is produced in the three-dimensional space through the three driving members, and finally the mobile phone mounted on the gimbal is maintained in a relatively stable state for shooting.

As shown in FIG. 1 to FIG. 3, the gimbal includes a first arm 100 and a second arm 200. One end of the first arm 100 is connected to the handle 300, and the other end of the first arm 100 is connected to the second arm 200. Specifically, the first arm 100 is hinged to the second arm 200. As shown in FIG. 3, an axis of a hinged shaft is m so that the second arm 200 can rotate around the hinged shaft m and then be folded towards the handle 300.

In one embodiment, as shown in FIG. 1 and FIG. 2, the first arm 100 includes a first connecting portion 110 and a first rod portion 111 fixedly connected to each other. The handle 300 may be in the shape of a long strip. The handle 300 may also be in the shape of a cylinder. As shown in FIG. 1, a rotation shaft of the first driving member 11 is a first rotating shaft a, a rotation shaft of the second driving member 12 is a second rotating shaft b, and a rotation shaft of the third driving member 13 is a third rotating shaft c. In an embodiment, after the gimbal is folded, the first rotating shaft a, the second rotating shaft b and the third rotating shaft c are all located in a same plane. The first connecting portion 110 is connected to the handle 300 by rotation around the first rotating shaft a.

As shown in FIG. 1 and FIG. 2, the second arm 200 includes a second connecting portion 210 and a second rod portion 211 detachably connected, and the second connecting portion 210 and the second rod portion 211 are rotatably connected. As shown in FIG. 1, the second connecting portion 210 and the second rod portion 211 are connected by rotation around the second rotating shaft b. Referring to FIG. 3, the second connecting portion 210 is connected, by rotation around the hinged shaft m, to one end of the first rod portion 111 away from the first connecting portion 110.

As shown in FIG. 1 to FIG. 3, the gimbal further includes a clamping member 400. The clamping member 400 is configured to clamp a shooting device such as a mobile phone. The clamping member 400 is rotatably connected to the second rod portion 211. As shown in FIG. 1, the clamping member 400 is connected to the second rod portion 211 by rotation around the third rotating shaft c.

Figure 4:
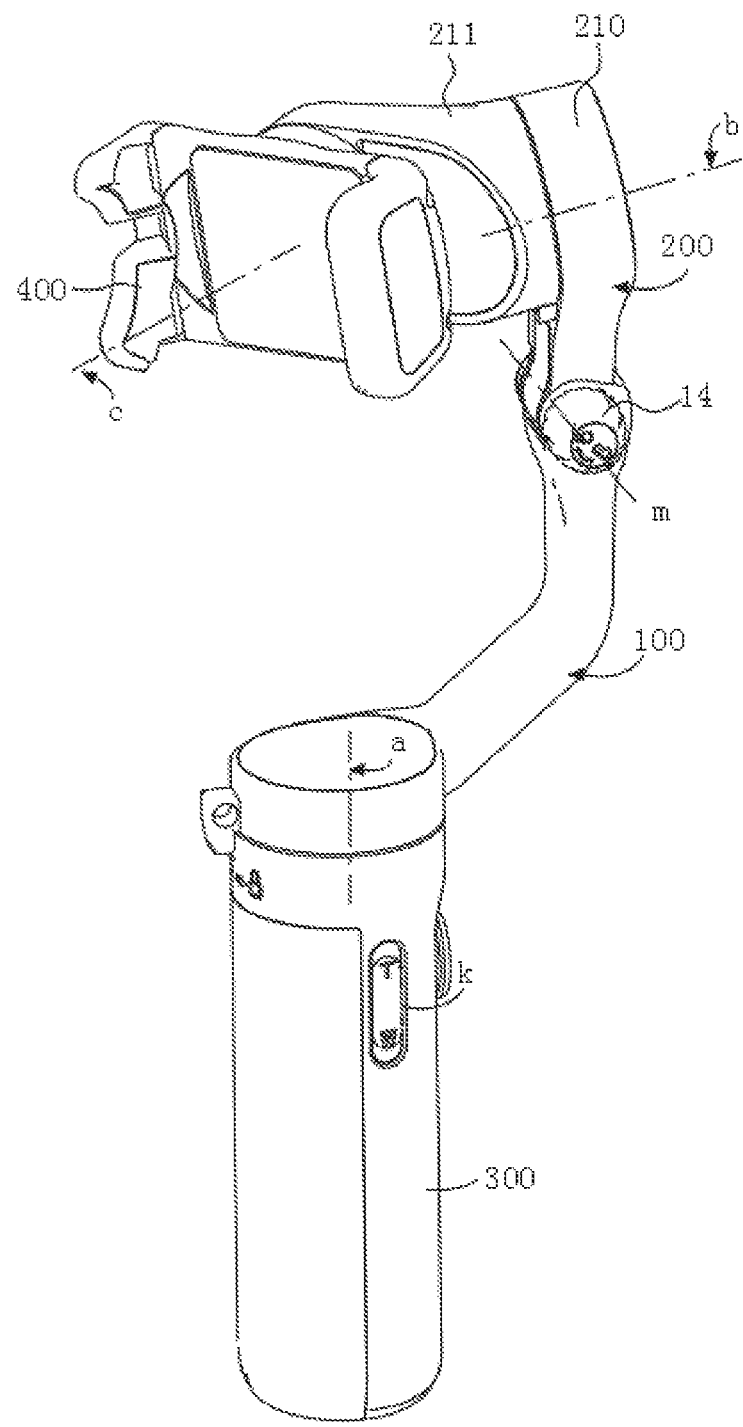
FIG. 4 is a schematic structural diagram of the gimbal in FIG. 1 after unfolding.

FIG. 4 is a schematic structural diagram of the gimbal in FIG. 1 after unfolding. An unfolding process is as follows. The second arm 200 is manually rotated around the hinged shaft m with respect to the first arm 100. Then, a switch k of the gimbal is turned on, and the gimbal starts to automatically complete the subsequent unfolding process. Referring to FIG. 1 and FIG. 4, the first driving member 11 drives the first arm 100 to rotate around the first rotating shaft a with respect to the handle 300, the second driving member 12 drives the second rod portion 211 to rotate around the second rotating shaft b with respect to the second connecting portion 210, and the third driving member 13 drives the clamping member 400 to rotate around the third rotating shaft c with respect to the second rod portion 211. During the folding, as shown in FIG. 1 and FIG. 4, the switch k of the gimbal is turned off, and the first driving member 11, the second driving member 12 and the third driving member 13 of the gimbal operate to complete the above reverse steps. Then, the second arm 200 is manually rotated around the hinged shaft m with respect to the first arm 100 to cause the clamping member 400 to abut against the handle 300 or the first connecting portion 110. During the folding, the second arm 200 and the clamping member 400 move towards the handle 300 as a whole.

As shown in FIG. 1, a final state after folding is the second driving member 12, the third driving member 13 and the first driving member 11 along an axis direction of the handle 300 (a vertical direction in FIG. 1). For example, after the folding, the third driving member 13 is located between the second driving member 12 and the first driving member 11 along the vertical direction. In the present application, after folding, a receiving position of a foldable part of the gimbal is roughly along the axial direction of the handle 300. That is, compared with an unfolded state of the gimbal, after folding, a longitudinal size of the gimbal becomes smaller, and a circumferential size of the gimbal increases slightly, or the circumferential size of the gimbal remains unchanged, or the circumferential size of the gimbal decreases, and then it is convenient to insert the gimbal into a narrow space such as a pocket for storage and carrying, which greatly facilitates the carrying of the gimbal.

Specifically, as shown in FIG. 1, after folding, the clamping member 400 is tilted with respect to the first rotating shaft a. The first rod portion 111 is connected to a circumferential side of the first connecting portion 110. The first rod portion 111 may also be arranged at a position off the center of the first connecting portion 110. Therefore, after folding, a rough receiving position of the clamping member 400 is in a region encircled by the handle 300 and the first rod portion 111. Therefore, the clamping member 400 does not have a large area attached to the circumferential side of the handle 300, so that, after folding, a circumferential volume of the gimbal does not increase significantly, which is elongated on the whole and is easily inserted directly into the pocket and easily carried.

By comparing FIG. 1 and FIG. 4, after the gimbal is folded, a relative position relationship between the first rotating shaft a and the second rotating shaft b changes, while a relative position relationship between the second rotating shaft b and the third rotating shaft c remains unchanged. Specifically, as shown in FIG. 1, after the gimbal is folded, the second rotating shaft b and the first rotating shaft a are roughly parallel. Further, in order to make the gimbal smaller in a circumferential direction of the handle 300, a spacing between the first rotating shaft a and the second rotating shaft b is controlled within 1 cm. It is to be understood that the second rotating shaft b and the first rotating shaft a being roughly parallel in the present application may specifically mean that an actual position relationship between the second rotating shaft b and the first rotating shaft a is parallel within an allowable error range. The error range may be 0° to 5° for example. Further, it is best that the spacing between the first rotating shaft a and the second rotating shaft b is 0, that is, the first rotating shaft A and the second rotating shaft B coincide.

Figure 5:
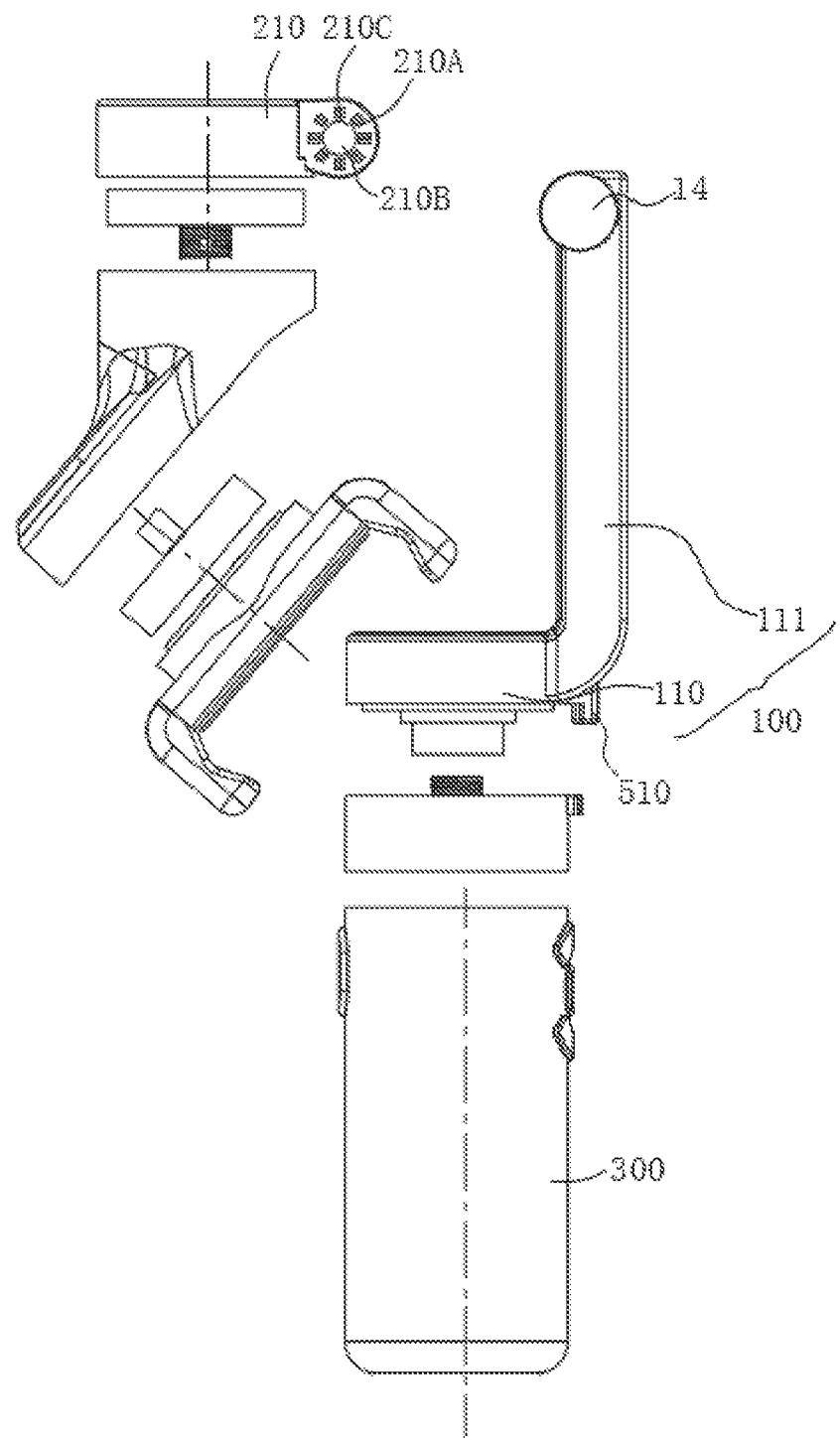
FIG. 5 is an exploded view of a gimbal according to a second embodiment of the present application.

FIG. 5 is an exploded view of a gimbal according to a second embodiment of the present application, which is mainly different from the first embodiment in the shape of the first arm 100. In the embodiment shown in FIG. 1, the first rod portion 111 in the first arm 100 first extends upward obliquely from the first connecting portion 110, and then extends along a direction parallel to the axial direction of the handle 300, so that an encircled space between the first arm 100 and the handle 300 is relatively large. After a mobile phone is mounted to the gimbal, a larger space for movement of the mobile phone may be provided. As shown in FIG. 5, the first rod portion 111 in the first arm 100 extends upward along a direction parallel to an axis of the handle 300 directly from the first connecting portion 110. In this case, the circumferential space of the gimbal is smaller, which is more convenient for storage and carrying.

Figure 6:
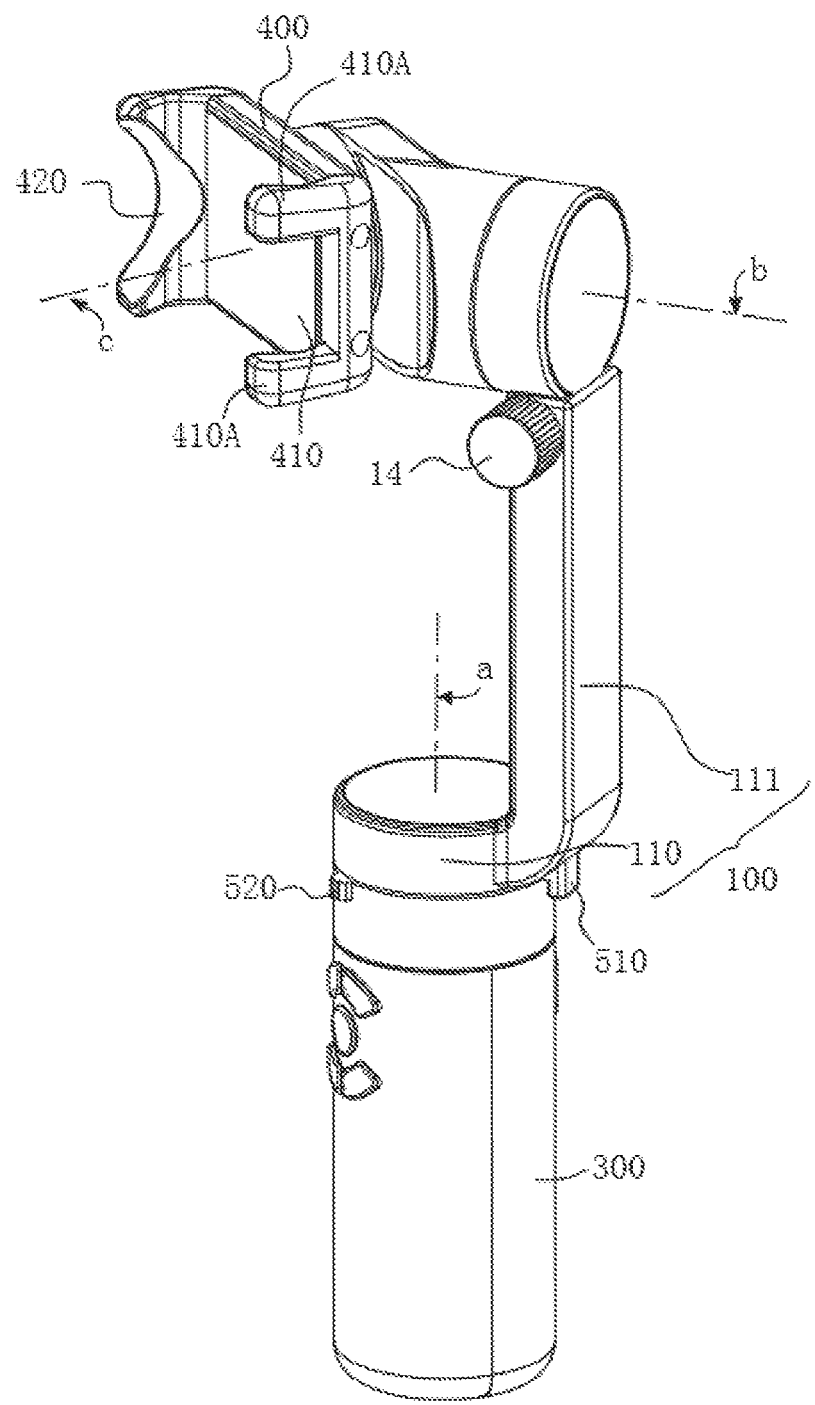
FIG. 6 is a schematic diagram of the gimbal in FIG. 5 after unfolding.

FIG. 6 is a schematic diagram of the gimbal in the embodiment of FIG. 5 after unfolding. As shown in FIG. 4 and FIG. 6, for the gimbals in the two embodiments, after the gimbals are fully unfolded, the first rotating shaft a, the second rotating shaft b and the third rotating shaft c are not parallel to one another, so that the clamping member 400 can rotate in the three-dimensional space with respect to the handle 300. In one embodiment, after the gimbal is fully unfolded, the first rotating shaft a and the second rotating shaft b are spatially perpendicular. If the second rotating shaft b and the third rotating shaft c translate to a same plane, the second rotating shaft b and the third rotating shaft c are not perpendicular, and an angle therebetween is an acute or obtuse angle, so that the clamped mobile phone can have a larger space for rotation, so as to minimize the interference of the gimbal with the movement of the mobile phone.

In one embodiment, as shown in FIG. 2 and FIG. 5, the second connecting portion 210 is provided with a convex hinged portion 210A, the hinged portion 210A is provided with a through hole 210B, the first rod portion 111 is provided with a groove, two sides of the groove are provided with sidewalls, and the hinged portion 210A is arranged in the groove. A threaded member 14 passes through one of the sidewalls and the through hole 210B on the hinged portion 210A and is in threaded connection to the other sidewall. When the threaded member 14 is turned, the two sidewalls can be pulled close to each other and squeeze the hinged portion 210A located in the groove, so as to achieve the locking of the first arm 100 and the second arm 200. In order to achieve a better locking effect, the hinged portion 210A is provided with a plurality of projections 210C, and the sidewalls of the groove are provided with a plurality of concave holes. The projections 210C can move into the concave holes. When the second arm 200 rotates with respect to the first arm 100, the projections 210C can be transferred in different concave holes. The threaded member 14 is turned to enable the two sidewalls to clamp the hinged portion 210A. In this case, the projections 210C are accommodated in the concave holes, so as to achieve a better anti-rotation effect. In other embodiments, the hinged portion 210A may be provided with the concave holes, and the sidewalls may be provided with the projections 210C.

In one embodiment, as shown in FIG. 1, the first driving member 11 is arranged on the handle 300. The first driving member 11 may be a motor. A housing of the first driving member 11 is fixed to the handle 300. A rotating shaft of the first driving member 11 may extend along a direction of the first rotating shaft a. The first connecting portion 110 is fixedly connected to the rotating shaft of the first driving member 11. Certainly, in one embodiment, the housing of the first driving member 11 may also be fixed to the first connecting portion 110, and the rotating shaft of the first driving member 11 is fixedly connected to the handle 300.

In one embodiment, the first arm 100 includes a first connecting portion 110 and a first rod portion 111. The first connecting portion 110 may be in the shape of a cylinder. The first rod portion 111 is fixed to a circumferential side of the first connecting portion 110. In this case, the first rod portion 111 is offset from the first rotating shaft a so that a space configured to accommodate at least part of the clamping member 400 and at least part of the second arm 200 is formed between the first rod portion 111 and the first connecting portion 110. As shown in FIG. 1, after the gimbal is folded, at least part of the clamping member 400 and at least part of the second arm 200 are received in the space, so that various parts of the folded gimbal are more compact and the volume of the gimbal is reduced. In the embodiment shown in FIG. 1, the first rod portion 111 is bent, one end of the first rod portion 111 close to the first connecting portion 110 is close to the first rotating shaft a, and one end of the first rod portion 111 away from the first connecting portion 110 is away from the first rotating shaft a. After the gimbal is folded, the clamping member 400 has one end clamping the handle 300 and the other end spaced from the first rod portion 111. A larger receiving space exists between the first connecting portion 110 and the second rod portion 211 to receive the clamping member 400 and the second arm 200, so as to provide more receiving space for the clamping member 400.

In the embodiment shown in FIG. 5, the first rod portion 111 is in the shape of a long strip, and a length direction of the first rod portion 111 extends along the direction of the first rotating shaft a. The first connecting portion 110 is in the shape of a cylinder. A central axis direction of the cylinder is an extension direction of the first rotating shaft a, and the length direction of the first rod portion 111 is perpendicular to an end surface of the cylinder.

In the embodiment shown in FIG. 5, both the handle 300 and the first rod portion 111 are in the shape of a straight rod, and lengths of the handle 300 and the first rod portion 111 are substantially the same.

In one embodiment, as shown in FIG. 6, the first arm 100 is provided with a first engaging portion 510, and the handle 300 is provided with a second engaging portion 520. When the first arm 100 rotates around the first rotating shaft a with respect to the handle 300 to the first engaging portion 510 against the second engaging portion 520, the rotation of the first arm 100 with respect to the handle 300 is locked so that unlimited rotation of the first arm 100 with respect to the handle 300 can be prevented. After folding, the first engaging portion 510 and the second engaging portion 520 engage with each other, so that the folded gimbal has a more stable structure.

In one embodiment, the first engaging portion 510 is a projection arranged on the first connecting portion 110, and the second engaging portion 520 is a groove or a projection arranged on the handle 300. In one embodiment, the first engaging portion 510 may also be a groove arranged on the first connecting portion 110.

In one embodiment, as shown in FIG. 1, the second driving member 12 may be a motor. A housing of the second driving member 12 is fixed to the second connecting portion 210. A rotating shaft of the second driving member 12 may extend along a direction of the second rotating shaft b. The rotating shaft of the second driving member 12 is fixedly connected to the second rod portion 211, so that the second driving member 12 can drive the second rod portion 211 to rotate around the second rotating shaft b with respect to the second connecting portion 210. In one embodiment, the housing of the second driving member 12 may also be fixedly connected to the second rod portion 211, and the rotating shaft is fixedly connected to the second connecting portion 210.

As shown in FIG. 2, the second rod portion 211 is provided with a first end surface 211A and a second end surface 211B. An angle between the first end surface 211A and the second end surface 211B is an acute angle. Referring to FIG. 1, the second rotating shaft b is perpendicular to the first end surface 211A, and the third rotating shaft c is perpendicular to the second end surface 211B.

As shown in FIG. 1, the third driving member 13 is a motor, a housing of the third driving member 13 may be fixedly connected to the second rod portion 211 of the second arm 200, and the rotating shaft is fixedly connected to the clamping member 400. In other embodiments, the housing of the third driving member 13 is fixedly connected to the clamping member 400, and the rotating shaft of the third driving member 13 is fixedly connected to the second rod portion 211 of the second arm 200.

Figure 7:
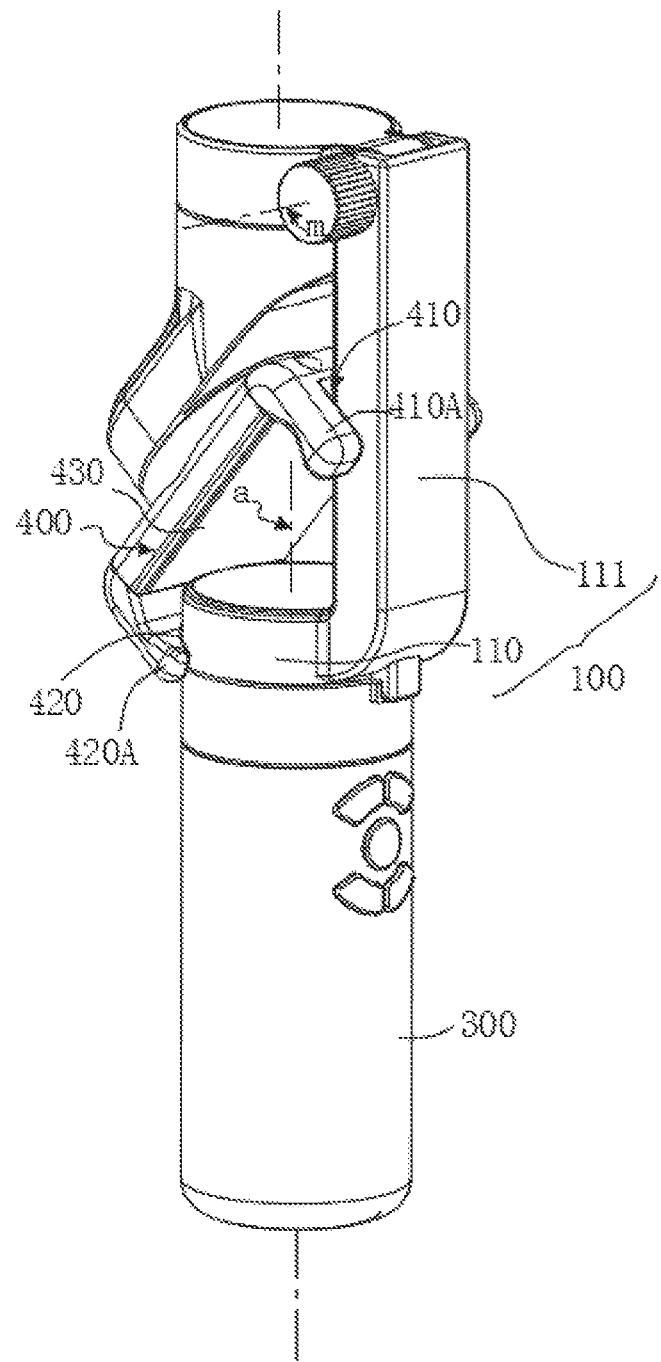
FIG. 7 is a schematic structural diagram of the gimbal in FIG. 5 after folding.

As shown in FIG. 6, the clamping member 400 is provided with a first slot 410. FIG. 7 is a schematic structural diagram of the gimbal in FIG. 5 after folding. After the gimbal is folded, the first rod portion 111 is partially accommodated in the first slot 410, and a sidewall of the first slot 410 of the clamping member 400 can abut against the first rod portion 111, so that the clamping member 400 may not rotate basically. Specifically, as shown in FIG. 6, the first slot 410 is formed by two first clamp fingers 410A spaced on the clamping member 400. After the gimbal is folded, the two first clamp fingers 410A may be attached to two sides of the first rod portion 111 respectively. In this case, the clamping member 400 no longer rotates with respect to the second arm 200, so that the folded gimbal has a more stable structure.

As shown in FIG. 6 and FIG. 7, the clamping member 400 is further provided with a second slot 420. After the gimbal is folded, part of the handle 300 is accommodated in the second slot 420. For example, an upper part of the handle 300 is accommodated in the second slot 420. Due to the arrangement of the first slot 410 and the second slot 420, the rotation of the clamping member 400 with respect to the second arm 200 can be limited through coordination between the first slot 410 and the first rod portion 111 and coordination between the second slot 420 and the handle 300 or the first connecting portion 110. In addition, after the gimbal is folded, the first rod portion 111 is partially accommodated in the first slot 410, and the handle 300 or the first connecting portion 110 is accommodated in the second slot 420, to enable the clamping member 400 to be further close to the handle 300 and the first arm 100, so that, after the gimbal is folded, the parts are more compact and the volume of the folded gimbal is reduced.

In one embodiment, the clamping member 400 is provided with a first buckle, the handle 300 or the first connecting portion 110 is provided with a second buckle, and after the gimbal is folded, the first buckle and the second buckle can be snapped. The rotation of the clamping member 400 can also be prevented through the snapping of the first buckle and the second buckle.

As shown in FIG. 6, the first slot 410 and the second slot 420 are in different shapes. The shape of the first slot 410 corresponds to that of the first rod portion 111, and the shape of the second slot 420 corresponds to that of the handle 300 or that of the first connecting portion 110. For example, a cross section of the first arm 100 is roughly rectangular, and the first slot 410 is encircled by inner walls of a plurality of planes. The handle 300 and the first connecting portion 110 are roughly cylindrical, and inner walls of the second slot 420 are roughly arc-shaped.

Figure 8:
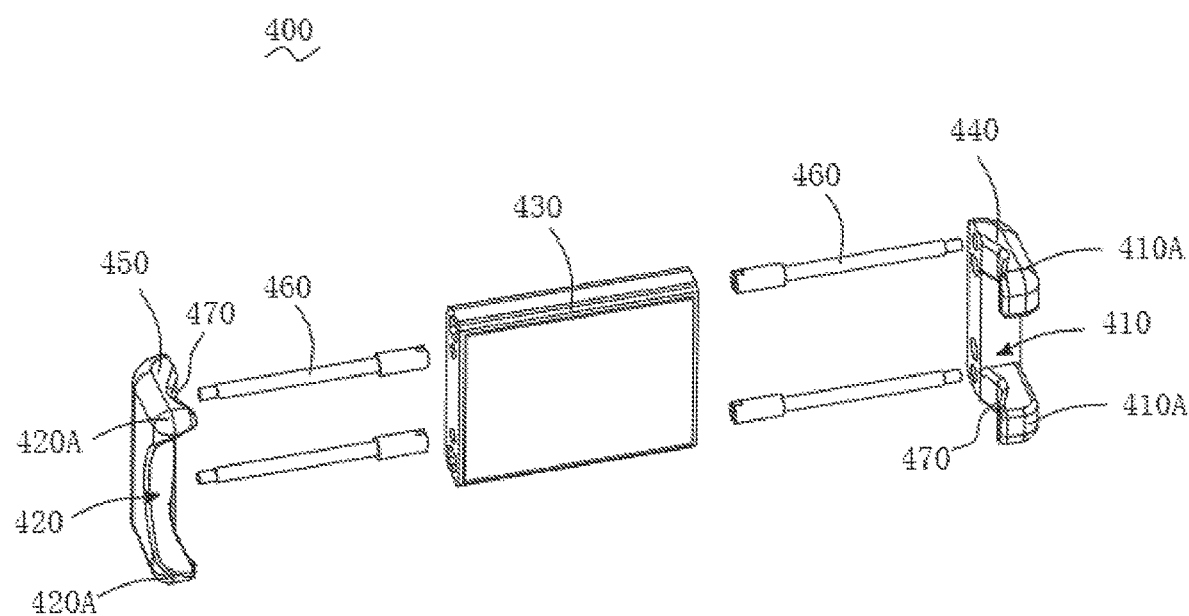
FIG. 8 is an exploded view of a clamping member included in the gimbal in FIG. 5.

FIG. 8 is an exploded view of the clamping member 400 in FIG. 5. As shown in FIG. 8, the clamping member 400 includes a support seat 430, a first movable seat 440 and a second movable seat 450. The first movable seat 440 and the second movable seat 450 are arranged on two sides of the support seat 430 respectively, the first movable seat 440 can be close to or away from the support seat 430, and the second movable seat 450 can also be close to or away from the support seat 430. The clamping member 400 further includes a plurality of elastic members 460, the first movable seat 440 is connected to the support seat 430 through two elastic members 460, and the second movable seat 450 is connected to the support seat 430 through another two elastic members 460. In use, the second moving seat 450 and the first moving seat 440 are pulled sideways so that the first moving seat 440 and the second moving seat 450 are away from each other, the mobile phone is arranged against the support seat 430, the first movable seat 440 and the second movable seat 450 are pulled towards the middle through the elastic members 460, and the mobile phone is jointly fixed through the first moving seat 440, the second moving seat 450 and the support seat 430.

As shown in FIG. 8, the first moving seat 440 includes two first clamp fingers 410A, the two first clamp fingers 410A are spaced, and the first slot 410 is formed between the two first clamp fingers 410A. The second moving seat 450 includes two second clamp fingers 420A, the two second clamp fingers 420A are spaced, and the second slot 420 is formed between the two second clamp fingers 420A. When the mobile phone is clamped, the firmness of the clamping is improved through joint abutment of the two first clamp fingers 410A, the two second clamp fingers 420A and the support seat 430 against the mobile phone.

As shown in FIG. 8, the support seat 430 is in the shape of a tablet, so as to better abut against the mobile phone, so that the mobile phone is stably fixed. In other words, at least a plane of the support seat 430 configured to abut against the mobile phone is a plane.

In one embodiment, as shown in FIG. 8, surfaces where the two first clamp fingers 410A and the two second clamp fingers 420A are opposite are provided with clip slots 470. When the mobile phone is mounted to the clamping member 400, the mobile phone is just stuck into the clip slots 470, so that the mobile phone is stably clamped and the mobile phone is not prone to shaking. In this embodiment, the mobile phone may not abut against the support seat 430.

In one embodiment, as shown in FIG. 7, after the gimbal is folded, the two first clamp fingers 410A are located on two sides of the first rod portion 111 respectively, and the two second clamp fingers 420A are attached to the handle 300. In this case, the support seat 430 is tilted with respect to the first rotating shaft a. That is, an angle between the support seat 430 as a whole and the first rotating shaft a is an acute angle. The support seat 430 as a whole may be understood as that an angle between a plane where a length axis and a width axis of the support seat 430 translate and intersect and the first rotating shaft a is an acute angle.

Figure 9:
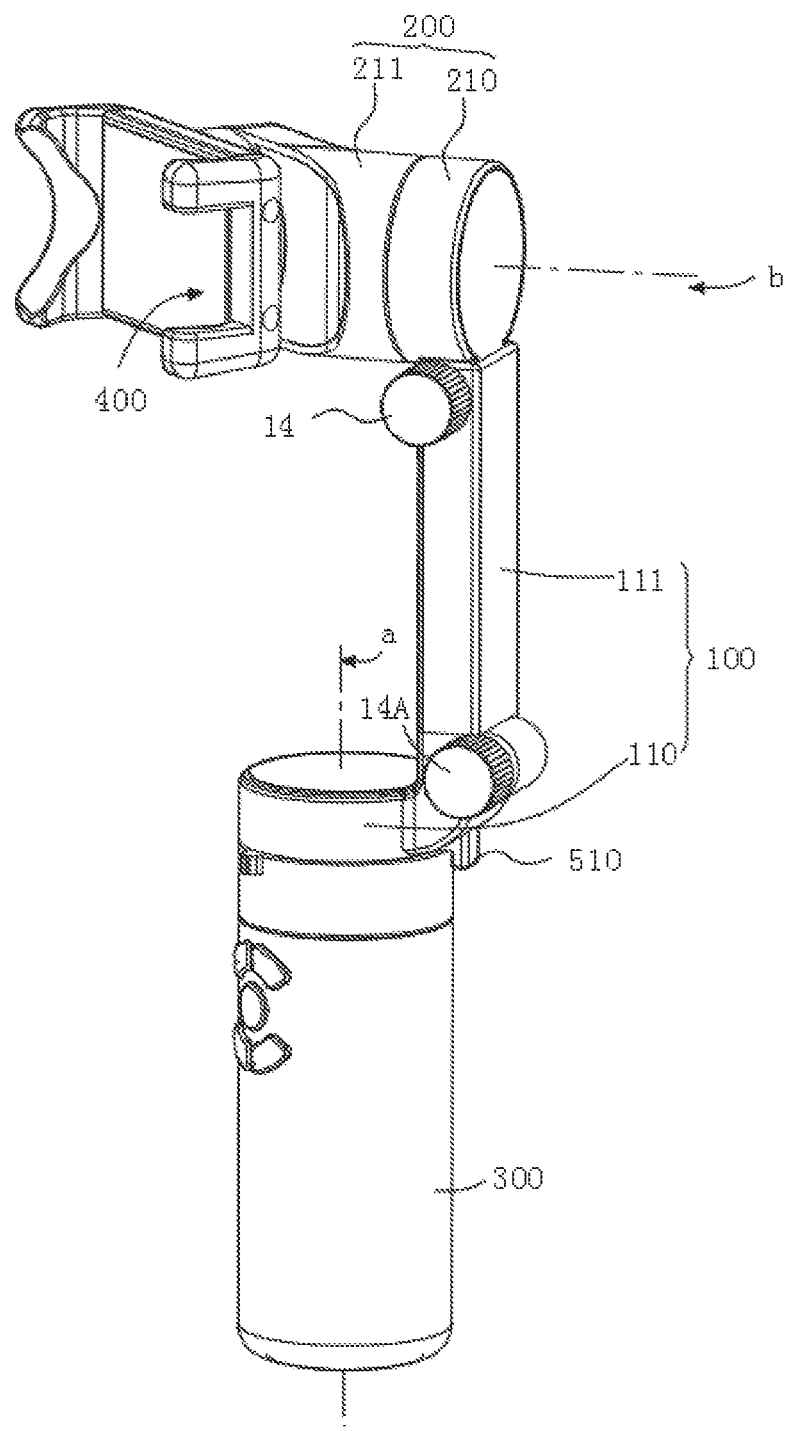
FIG. 9 is a three-dimensional view of an unfolded gimbal according to a third embodiment of the present application.
Figure 10:
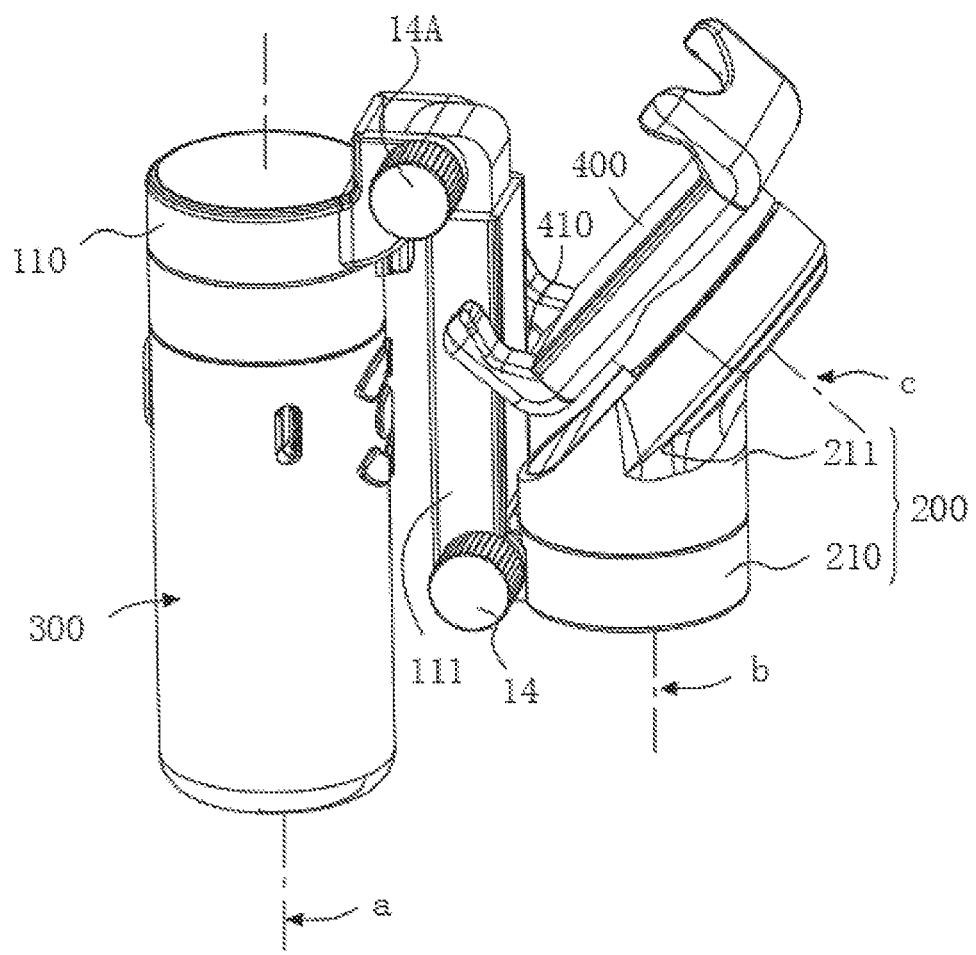
FIG. 10 is a three-dimensional view of the gimbal in FIG. 9 after folding.

FIG. 9 is a three-dimensional view of an unfolded gimbal according to a third embodiment. FIG. 10 is a three-dimensional view of the gimbal in FIG. 9 after folding. A bi-fold gimbal shown in FIG. 9 and FIG. 10 is introduced in the following embodiments. The gimbal is required to be folded twice when folded from the unfolded state shown in FIG. 9 to the fully folded state shown in FIG. 10.

As shown in FIG. 9, the first arm 100 includes a first connecting portion 110 and the first rod portion 111 hinged to each other, and the first connecting portion 110 is connected to the handle 300 by rotation around the first rotating shaft a. After folding, as shown in FIG. 10, the first connecting portion 110 and the first rod portion 111 can be locked through the threaded member 14A. The second arm 200 includes a second connecting portion 210 and a second rod portion 211, and one end of the second rod portion 211 is connected to the second connecting portion 210 by rotation around the second rotating shaft b. The second connecting portion 210 is hinged to one end of the first rod portion 111 away from the first connecting portion 110. After folding, the second connecting portion 210 and the first rod portion 111 can be locked through the threaded member 14.

As shown in FIG. 10, after folding, the first rod portion 111 of the first arm 100 and the second arm 200 are received on a side in a circumferential direction of the handle 300. The circumferential direction of the handle 300 may be understood as follows. If the handle 300 is in the shape of a cylinder, the cylinder has a central axis. In fact, the first rotating shaft a may be the central axis. Among a plurality of lines parallel to the central axis, any line not passing through the handle 300 may be called a line on the side in the circumferential direction of the handle 300. After the gimbal according to this embodiment is folded, an axial dimension along the central axis of the handle 300 is greatly reduced for easy storage.

In one embodiment, as shown in FIG. 10, after folding, the first rod portion 111 of the first arm 100 is located between the handle 300 and the second arm 200. In this embodiment, after the gimbal is folded, the components are arranged more compactly and occupy less storage space.

In one embodiment, as shown in FIG. 10, after folding, the first rotating shaft a, the second rotating shaft b and the third rotating shaft c are coplanar. As shown in FIG. 9, when the gimbal is unfolded for use, the first rotating shaft a, the second rotating shaft b and the third rotating shaft c are distributed in a three-dimensional space. That is, the three rotating shafts are not distributed in a same plane. In this case, the first rotating shaft a and the second rotating shaft b may be in a same plane and perpendicular to each other. When the gimbal is turned off, the second rod portion 211 is rotated around the second rotating shaft b by a certain angle with respect to the second connecting portion 210, so that the third rotating shaft c and the second rotating shaft b are coplanar. Since the first rotating shaft a and the second rotating shaft b may be in a same plane and perpendicular to each other, the three rotating shafts are in the same plane in this case. Since the three rotating shafts are coplanar, the folded gimbal as a whole has a flat structure, which occupies less storage space and is easy to carry and store.

In one embodiment, as shown in FIG. 10, after folding, one end of the clamping member 400 abuts against the first rod portion 111, and the other end of the clamping member 400 is a free end. If the clamping member 400 may still be rotated freely after folding, it is not convenient for storage. In this embodiment, after folding, free rotation of the clamping member 400 after folding can be prevented to some extent through the abutment of the clamping member 400 against the first rod portion 111. In one embodiment, the clamping member 400 is provided with at least a first slot 410. After the gimbal is folded, the first rod portion 111 is partially accommodated in the first slot 410, and the rotation of the clamping member may be better limited by the coordination between the first slot 410 and the first rod portion 111.

Figure 11:
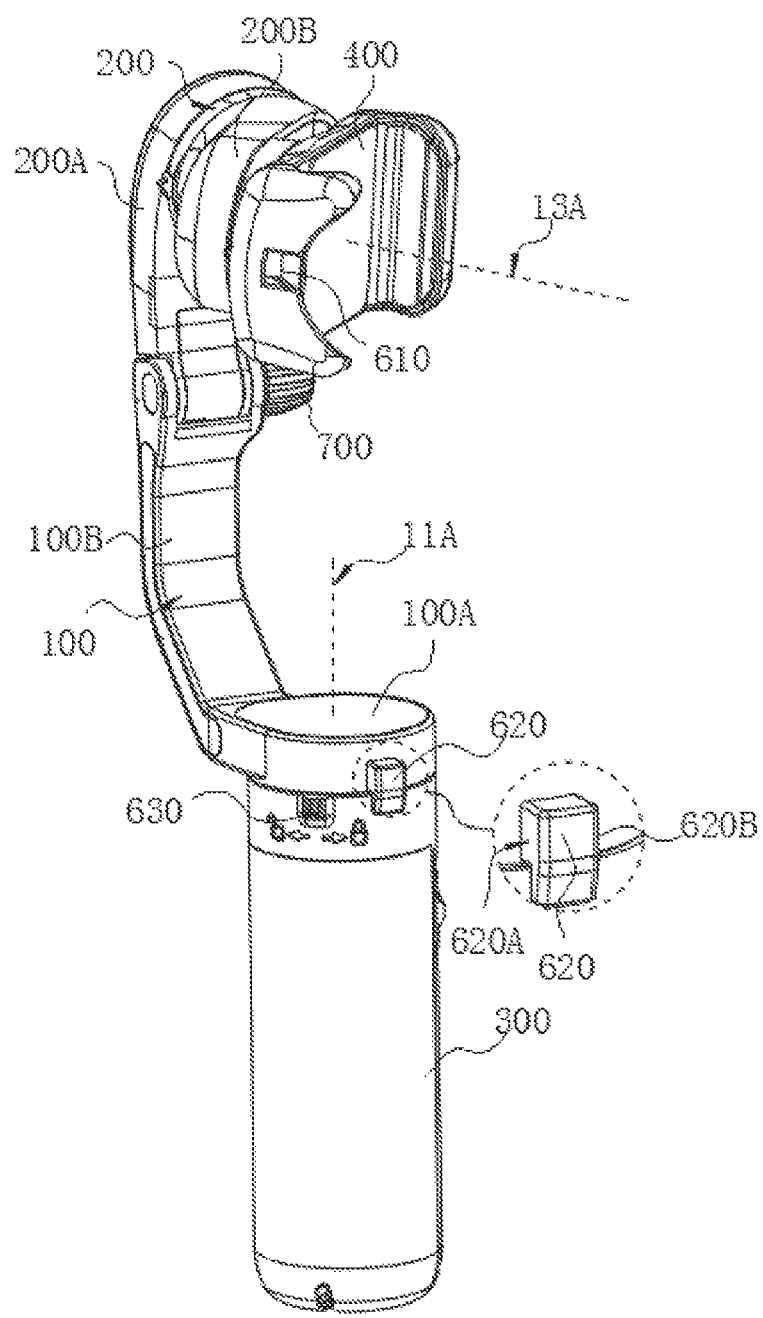
FIG. 11 is a three-dimensional view of a gimbal according to a fourth embodiment of the present application.

FIG. 11 is a three-dimensional view of a gimbal according to a fourth embodiment of the present application. The gimbal includes a handle 300. In one use scenario, the handle 300 may be used as a gripping portion. That is, a person holds the handle 300 to grip the gimbal. In another use scenario, the handle 300 may be supported by a support base. The gimbal is supported through the support base. In this case, the gimbal may be used as a mobile phone holder and the base may be placed on a vehicle and other places where shooting environments are required to be stabilized.

Figure 12:
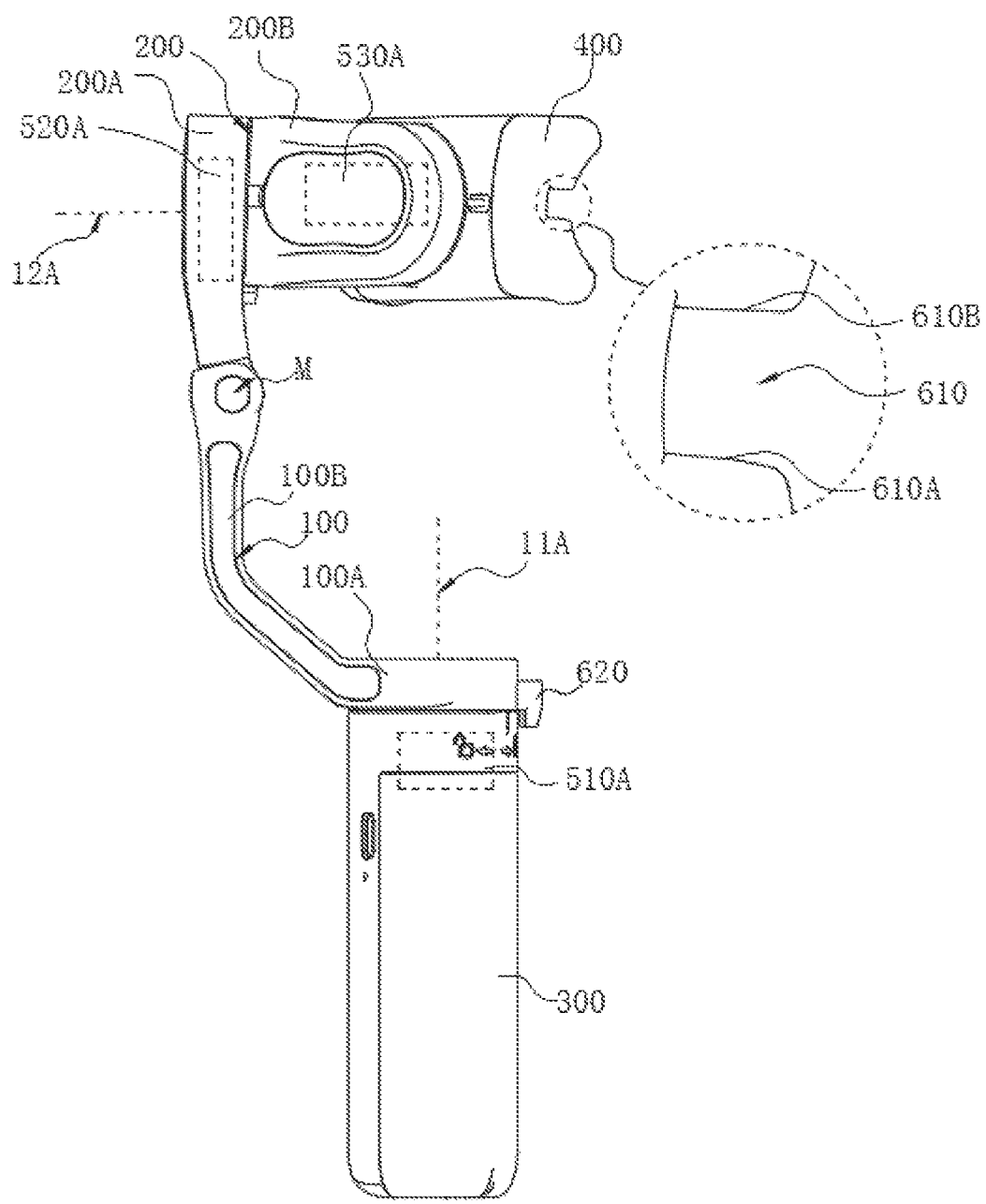
FIG. 12 is a front view of the gimbal shown in FIG. 11.

FIG. 12 is a front view of the gimbal shown in FIG. 11. As shown in FIG. 11 and FIG. 12, the gimbal includes a handle 300, a first arm 100, a second arm 200 and a clamping member 400 sequentially connected. The clamping member 400 may clamp a mobile phone.

As shown in FIG. 12, one end of the first arm 100 is connected to the handle 300, and the other end of the first arm 100 is connected to the second arm 200. Specifically, the first arm 100 includes a first connecting portion 100A and a first rod portion 100B. For example, the first connecting portion 100A and the first rod portion 100B may be fixedly connected, the first connecting portion 100A is connected to the handle 300, and the first rod portion 100B is connected to the second arm 200.

Figure 14:
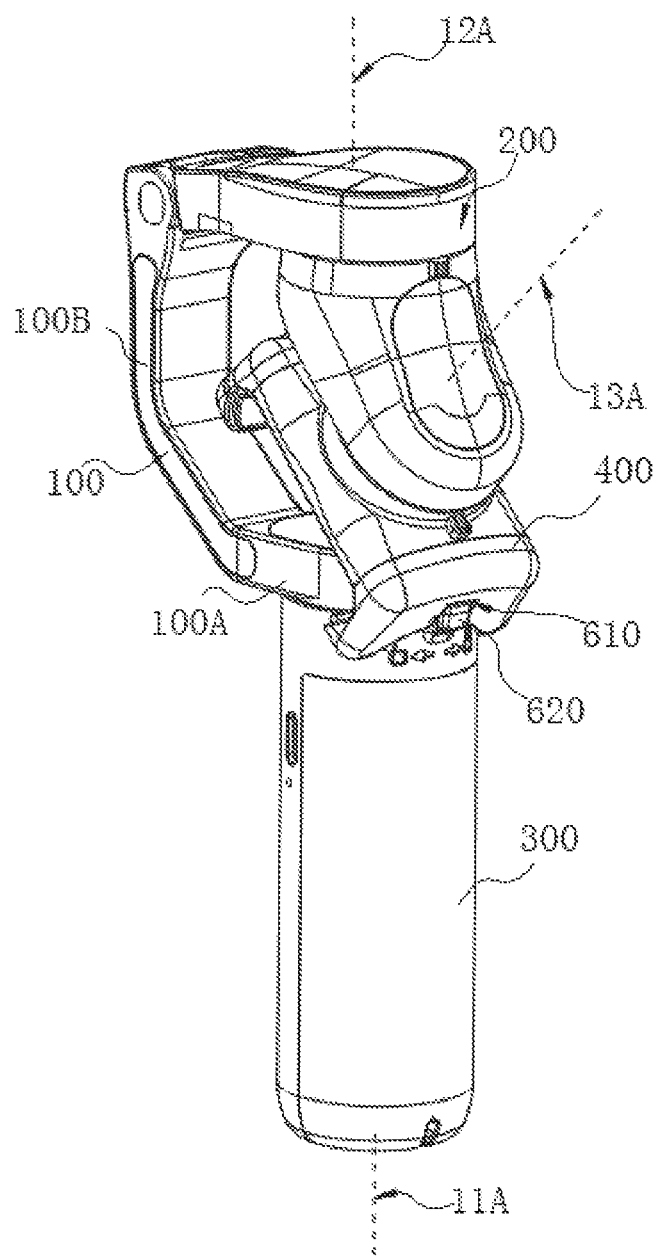
FIG. 14 is a three-dimensional view of the gimbal in FIG. 11 after folding.

As shown in FIG. 12, the second arm 200 includes a second connecting portion 200A and a second rod portion 200B, and the second connecting portion 200A and the second rod portion 200B are rotatably connected. Specifically, the second rod portion 200B is connected to the second connecting portion 200A by rotation around a second shaft 12A. The first arm 100 is hinged to the second arm 200. Specifically, one end of the first rod portion 100B away from the first connecting portion 100A is hinged to the second connecting portion 200A at M in FIG. 12. The second arm 200 can rotate around M with respect to the first arm 100, so that the second arm 200 moves towards the direction of the handle 300 to complete the folding of the gimbal. Refer to FIG. 14 for a state after folding. FIG. 14 is a three-dimensional view of the gimbal in FIG. 11 after folding.

As shown in FIG. 12, the gimbal includes three driving members, that is, a first driving member 510A, a second driving member 520A and a third driving member 530A. The first driving member 510A is connected to the handle 300 and the first connecting portion 100A of the first arm 100, so that the first arm 100 can rotate along an axial direction of the handle 300. For example, the axial direction of the handle 300 may be a first shaft 11A. The second driving member 520A is connected to the second connecting portion 200A and the second rod portion 200B of the second arm 200, so that the second rod portion 200B can rotate around the second shaft 12A with respect to the second connecting portion 200A. As shown in FIG. 11 and FIG. 12, the third driving member 530A is connected to the second rod portion 200B and the clamping member 400, so that the clamping member 400 can rotate around a third shaft 13A with respect to the second rod portion 200B. After the gimbal is unfolded, when the gimbal is in a certain attitude, the first shaft 11A and the second shaft 12A are spatially perpendicular, and an angle between the third shaft 13A and the second shaft 12A is an acute angle. After the gimbal is unfolded, the three driving members are arranged in a three-dimensional space. The driving members may be motors. Driving shafts of the three motors may extend along directions of the first shaft 11A, the second shaft 12A and the third shaft 13A respectively. As shown in FIG. 12 and FIG. 14, after the gimbal is folded or unfolded, a relative position relationship of the three shafts varies. When the gimbal according to the present application clamps the mobile phone, angle fine-tuning is performed mainly depending on coordination among the first driving member 510A, the second driving member 520A and the third driving member 530A, to finally enable the mobile phone on the clamping member 400 to maintain a stable state.

As shown in FIG. 11 and FIG. 14, the gimbal according to the present application may be unfolded and folded, when unfolded, the gimbal is in a use state, and when folded, the gimbal is in a storage state. When the gimbal is unfolded, the handle 300, the first arm 100, the second arm 200 and the clamping member 400 are required to be movable relative to one another, so as to keep the mobile phone on the clamping member 400 stable by fine-tuning the angles of the handle 300, the first arm 100, the second arm 200 and the clamping member 400. During the folding, the handle 300, the first arm 100, the second arm 200 and the clamping member 400 are required to be fixed relative to one another, so that the folded gimbal maintains a stable shape.

As shown in FIG. 11, the clamping member 400 is provided with a first engaging portion 610, and the first connecting portion 100A is provided with a second engaging portion 620. The first engaging portion 610 is a groove body, and the second engaging portion 620 is a convex block. As shown in FIG. 14, after the gimbal is folded, the second engaging portion 620 is inserted into the first engaging portion 610, so that the first arm 100, the second arm 200 and the clamping member 400 are interlocked and positions of the first arm 100, the second arm 200 and the clamping member 400 are unchangeable. Specifically, as shown in FIG. 12, the first engaging portion 610 as a groove body includes a first groove surface 610A and a second groove surface 610B opposite to each other, the second engaging portion 620 as a convex block includes a first sidewall 620A and a second sidewall 620B opposite to each other, the first engaging portion 610 is inserted into the second engaging portion 620, the first sidewall 620A abuts against the first groove surface 610A, and the second sidewall 620B abuts against the second groove surface 610B. In other embodiments, the first engaging portion 610 as a groove body further includes other groove surfaces in addition to the first groove surface 610A and the second groove surface 610B; and the second engaging portion 620 as a convex block further includes other sidewalls in addition to the first sidewall 620A and the second sidewall 620B.

In other embodiments, the first engaging portion 610 may also be a convex block, and the second engaging portion 620 may be a groove body. That is, in this embodiment, the first engaging portion 610 and the second engaging portion 620 are interchangeable in shape.

As shown in FIG. 14, when the gimbal is in the folded state, the clamping member 400 is tilted with respect to the axial direction of the handle 300, one end of the clamping member 400 abuts against the first connecting portion 100A of the first arm 100, and the other end of the clamping member 400 is spaced from the first rod portion 100B of the first arm 100.

In other embodiments, when the gimbal is in the folded state, the clamping member 400 is tilted with respect to the axial direction of the handle 300, one end of the clamping member 400 abuts against the first connecting portion 100A of the first arm 100, and the other end of the clamping member 400 may also abut against the first rod portion 100B of the first arm 100.

In the above embodiment, the first engaging portion 610 engages with the second engaging portion 620, so that the first arm 100, the second arm 200 and the clamping member 400 are interlocked when the gimbal is in the folded state. That is, the first arm 100, the second arm 200 and the clamping member 400 can be interlocked only through mutual engagement between the first engaging portion 610 and the second engaging portion 620, which has a simple structure and can realize reliable locking.

In one embodiment, the first rod portion 100B is bent, and the first rod portion 100B in the first arm 100 first extends upward obliquely from the first connecting portion 100A, and then extends along a direction parallel to the axial direction of the handle 300, so that an encircled space between the first arm 100 and the handle 300 is relatively large. After a mobile phone is mounted to the gimbal, a larger space for movement of the mobile phone may be provided.

The first connecting portion 100A and the first rod portion 100B in the first arm 100 are fixedly connected. The clamping member is rotatably connected to one end of the first rod portion 100B away from the first connecting portion 100A. When the gimbal is folded, the shape of the first arm 100 remains unchanged, and the second arm 200 and the clamping member 400 rotate around M towards the handle 300 to achieve folding. When folded, the gimbal is folded from the state shown in FIG. 11 into the state shown in FIG. 14. During the folding, the third driving member 530A drives the clamping member 400 to rotate by 90°, the second driving member 520A drives the second rod portion 200B to rotate by 90°, and then the second arm 200 and the clamping member 400 are manually rotated around M towards the handle 300 to achieve folding. Thus, the first engaging portion 610 engages with the second engaging portion 620.

Figure 13:
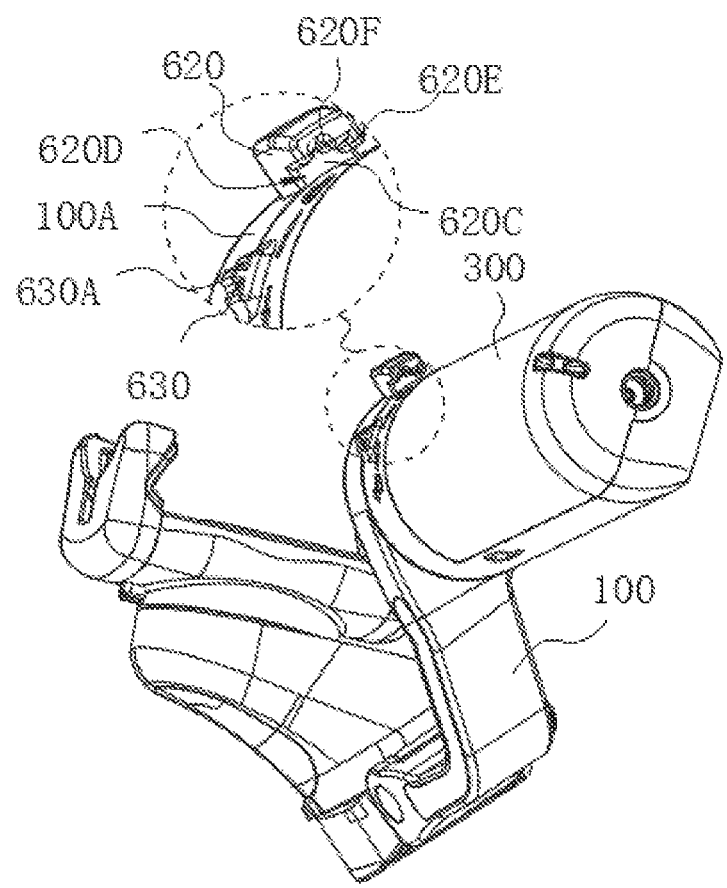
FIG. 13 is a three-dimensional view of the gimbal shown in FIG. 11 from another perspective.

In one embodiment, FIG. 13 is a three-dimensional view of the gimbal shown in FIG. 11 from another perspective. As shown in FIG. 11 and FIG. 13, the handle 300 is provided with a third engaging portion 630, the third engaging portion 630 is a projection arranged on the handle 300, the second engaging portion 620 is provided with a slot 620C, and when the handle 300 rotates with respect to the first connecting portion 100A of the first arm 100, the third engaging portion 630 can be screwed into the slot 620C of the second engaging portion 620. After the third engaging portion 630 in the shape of a projection engages with the slot 620C, the rotation of the handle 300 with respect to the first arm 100 is locked.

For example, as shown in FIG. 13, the slot 620C has an opening 620D and a stop portion 620E. When the handle 300 rotates with respect to the first connecting portion 100A of the first arm 100, the third engaging portion 630 can enter the slot 620C of the second engaging portion 620 from the opening 620D. When the handle 300 continuously rotates, the third engaging portion 630 can abut against the stop portion 620E of the slot 620C. Therefore, the rotation of the handle 300 with respect to the first connecting portion 100A is locked. The slot 620C is further provided with a concave portion 620F. The third engaging portion 630 is further provided with a convex portion 630A. When the third engaging portion 630 enters the slot 620C of the second engaging portion 620, the convex portion 630A coordinates with the concave portion 620F, so as to realize the complete locking of the handle 300 and the first arm 100.

Further, the handle 300 is rotated to enable the third engaging portion 630 to engage with the second engaging portion 620, to finally obtain the folded state shown in FIG. 14. In the state, a freedom of movement of each part of the gimbal is limited.

As shown in FIG. 11, a locking member 700 is arranged at a position where the first arm 100 and the second arm 200 are rotatably connected. The locking member 700 may be a threaded member. After the gimbal is unfolded, attitudes of the first arm 100 and the second arm 200 can be fixed through the locking member 700. After the gimbal is folded, the attitudes of the first arm 100 and the second arm 200 can be further fixed through the locking member 700.

Figure 15:
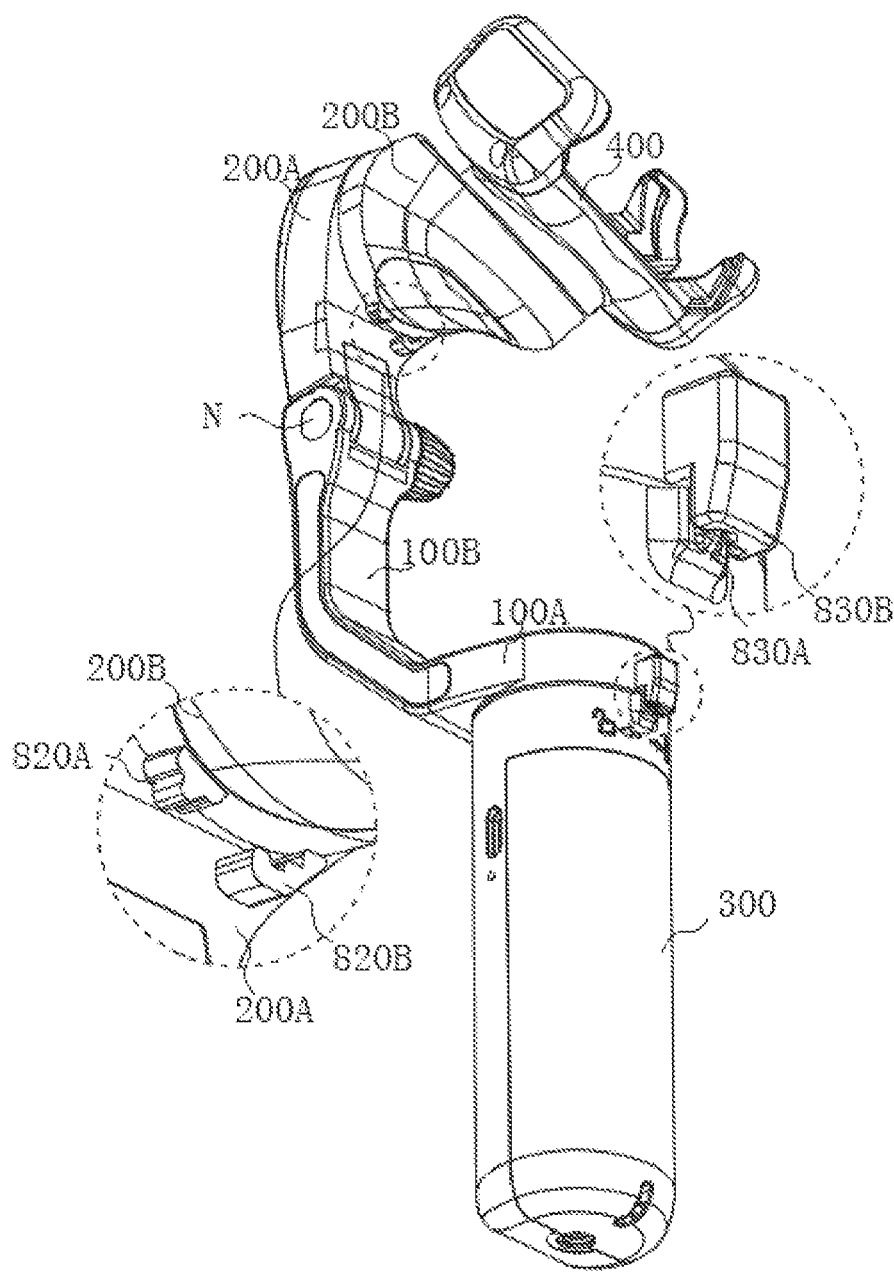
FIG. 15 is a schematic diagram of a three-dimensional structure of a gimbal according to a fifth embodiment of the present application.
Figure 16:
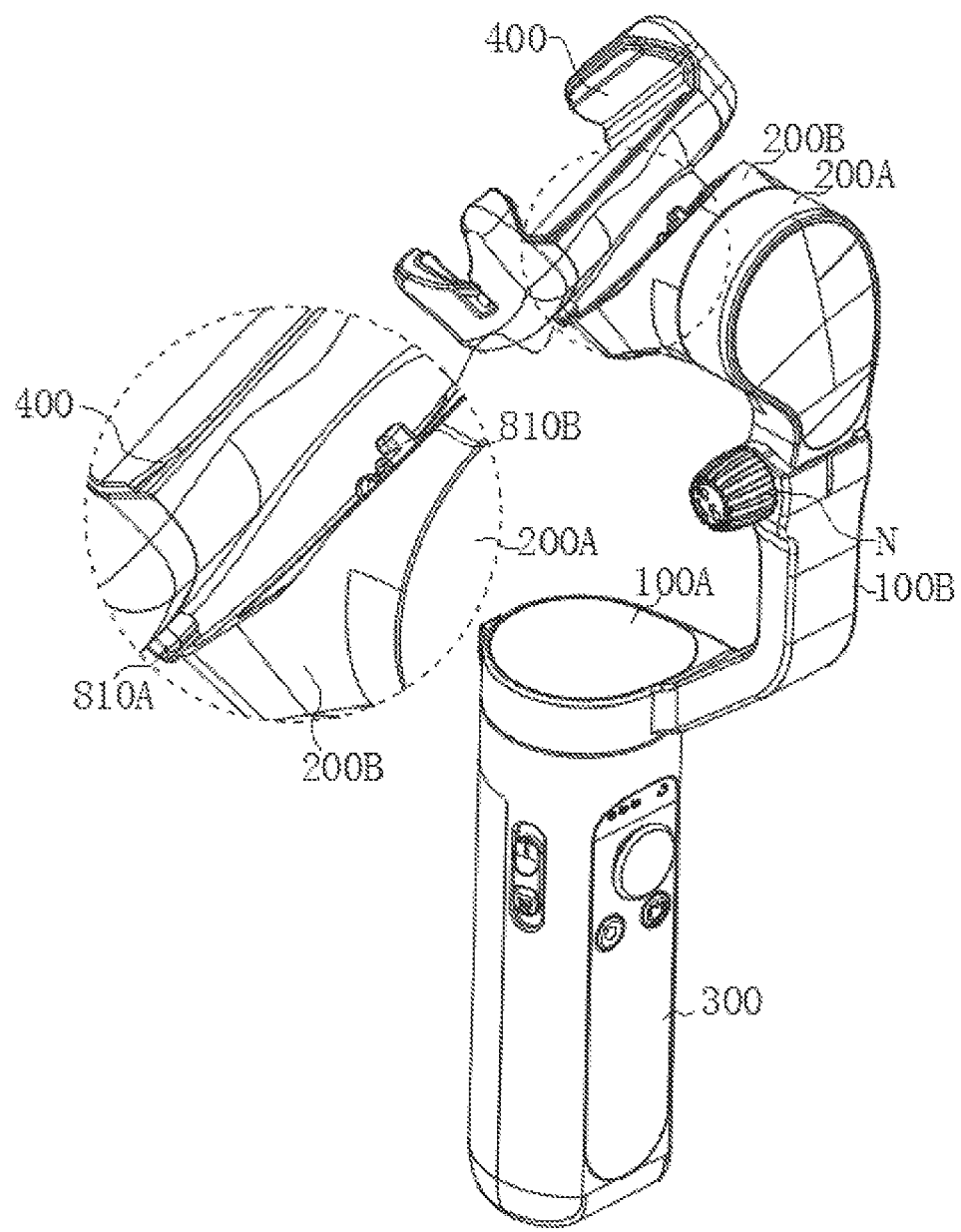
FIG. 16 is a schematic structural diagram of the gimbal shown in FIG. 15 from another perspective.

As shown in FIG. 15, FIG. 15 is a schematic diagram of a three-dimensional structure of a gimbal according to a fifth embodiment of the present application. FIG. 16 is a schematic structural diagram of the gimbal shown in FIG. 15 from another perspective.

As shown in FIG. 15 and FIG. 16, the gimbal according to this embodiment may also be used as a mobile phone holder.

The gimbal shown in FIG. 15 and FIG. 16 has a structure similar to that of the gimbal shown in FIG. 11 to FIG. 14. As shown in FIG. 15 and FIG. 16, the gimbal includes a handle 300, a first arm 100, a second arm 200 and a clamping member 400 sequentially connected. The clamping member 400 may clamp a mobile phone. One end of the first arm 100 is connected to the handle 300, and the other end of the first arm 100 is connected to the second arm 200. Specifically, the first arm 100 includes a first connecting portion 100A and a first rod portion 100B. For example, the first connecting portion 100A and the first rod portion 100B may be fixedly connected, the first connecting portion 100A is connected to the handle 300, and the first rod portion 100B is connected to the second arm 200. The second arm 200 includes a second connecting portion 200A and a second rod portion 200B, and the second connecting portion 200A and the second rod portion 200B are rotatably connected. Specifically, the second rod portion 200B is connected to the second connecting portion 200A by rotation around a second shaft 12A. The first arm 100 is hinged to the second arm 200. Specifically, one end of the first rod portion 100B away from the first connecting portion 100A is hinged to the second connecting portion 200A at N in FIG. 16. The second arm 200 can rotate around N with respect to the first arm 100, so that the second arm 200 moves towards the direction of the handle 300 to complete the folding of the gimbal.

The gimbal shown in FIG. 15 and FIG. 16 has at least the following structural differences from the gimbal shown in FIG. 11 to FIG. 14. When the gimbal is used as a mobile phone holder, a power supply of the gimbal may be turned off, and relative positions of the first arm 100, the second arm 200, the clamping member 400 and the handle 300 may be locked by means of mechanical locking. The handle 300 is mounted on a base such as a tripod, the base is then placed on a tabletop, and the gimbal can be used as a mobile phone holder.

Specifically, the gimbal includes a first locking component 810 configured to lock the clamping member 400 and the first arm 100, a second locking component 820 configured to lock the second connecting portion 200A and the second rod portion 200B, and a third locking component 830 configured to lock the first rod portion 100B and the handle 300. When the gimbal is unfolded and clamps the mobile phone, the first locking component 810, the second locking component 820 and the third locking component 830 lock the gimbal, so that the clamping member 400 is relatively fixed to the first arm 100, the second connecting portion 200A is relatively fixed to the second rod portion 200B, and the first rod portion 100B is relatively fixed to the handle 300.

As shown in FIG. 16, the first locking component 810 includes a first locking pin 810A and a first locking seat 810B that can be interlocked. In the embodiment shown in FIG. 15 and FIG. 16, the first locking pin 810A is arranged on the clamping member 400, and the first locking seat 810B is arranged on the second rod portion 200B of the second arm 200. The clamping member 400 can rotate with respect to the second rod portion 200B, so that the first locking pin 810A is moved into the first locking seat 810B and is locked with the first locking seat 810B. For example, the first locking seat 810B has a groove portion, and when the first locking pin 810A slides into the groove portion, the first locking pin 810A and the first locking seat 810B are locked. In other embodiments, the first locking pin 810A may be arranged on the second rod portion 200B of the second arm 200; and the first locking seat 810B is arranged on the clamping member 400.

As shown in FIG. 15, the second locking component 820 includes a second locking pin 820A and a second locking seat 820B that can be interlocked. In the embodiment shown in FIG. 15 and FIG. 16, the second locking pin 820A is arranged on the second rod portion 200B, and the second locking seat 820B is arranged on the second connecting portion 200A. The second rod portion 200B can rotate with respect to the second connecting portion 200A, so that the second locking pin 820A is moved into the second locking seat 820B and is locked with the second locking seat 820B. For example, the second locking seat 820B has a groove portion, and when the second locking pin 820A slides into the groove portion, the second locking pin 820A and the second locking seat 820B are locked. In other embodiments, the second locking pin 820A may be arranged on the second connecting portion 200A, and the second locking seat 820B may be arranged on the second rod portion 200B.

As shown in FIG. 15, the third locking component 830 includes a third locking pin 830A and a third locking seat 830B that can be interlocked. In the embodiment shown in FIG. 15 and FIG. 16, the third locking pin 830A is arranged on the handle 300, and the third locking seat 830B is arranged on the first connecting portion 100A of the first arm 100. The handle 300 can rotate with respect to the first arm 100, so that the third locking pin 830A is moved into the third locking seat 830B and is locked with the third locking seat 830B. For example, the third locking seat 830B has a groove portion, and when the third locking pin 830A slides into the groove portion, the third locking pin 830A and the third locking seat 830B are locked. In other embodiments, the third locking pin 830A may be arranged on the first connecting portion 100A of the first arm 100; and the third locking seat 830B may be arranged on the handle 300.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the present disclosure. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A gimbal, comprising a handle (300), a first arm (100), a second arm (200) and a clamping member (400) sequentially connected, the second arm (200) comprising a second connecting portion (210) and a second rod portion (211); and further comprising:
    a first driving member (11) connected to the handle (300) and the first arm (100) to drive the first arm (100) to rotate with respect to the handle (300);
    a second driving member (12) connected to the second connecting portion (210) and the second rod portion (211) in the second arm (200) to drive the second rod portion (211) to rotate with respect to the second connecting portion (210); and
    a third driving member (13) connected to the second rod portion (211) and the clamping member (400) to drive the clamping member (400) to rotate with respect to the second rod portion (211);
    wherein the second connecting portion (210) is rotatably connected to the first arm (100) so that the gimbal is foldable or unfoldable, and after the gimbal is folded, the second driving member (12), the third driving member (13) and the first driving member (11) are sequentially arranged along an axis direction of the handle (300).

2. The gimbal according to claim 1, wherein the first arm (100) comprises a first connecting portion (110) and a first rod portion (111), the first connecting portion (110) is connected to the handle (300), and the first rod portion (111) is connected to the second connecting portion (210).

3. The gimbal according to claim 2, wherein the second connecting portion (210) is rotatably connected to one end of the first rod portion (111) away from the first connecting portion (110).

4. The gimbal according to claim 2, wherein the first connecting portion (110) is fixedly connected to the first rod portion (111).

5. The gimbal according to claim 2, wherein the first rod portion (111) is connected to a circumferential side of the first connecting portion (110), so that a space configured to accommodate at least part of the clamping member (400) and at least part of the second arm (200) is formed between the first rod portion (111) and the first connecting portion (110).

6. The gimbal according to claim 5, wherein the first rod portion (111) is a bending rod, and after the gimbal is folded, the clamping member (400) is capable of clamping the handle (300), and the clamping member (400) is spaced from the first rod portion (111);
    or the first rod portion (111) is a straight rod, the first rod portion (111) extends along an axial direction of the handle (300), and after the gimbal is folded, the clamping member (400) is capable of clamping the first rod portion (111) and the handle (300).

7. The gimbal according to claim 1, wherein the first arm (100) is provided with a first engaging portion (510), the handle (300) is provided with a second engaging portion (520), and when the first arm (100) rotates with respect to the handle (300) to the first engaging portion (510) against the second engaging portion (520), the rotation of the first arm (100) with respect to the handle (300) is locked.

8. The gimbal according to claim 1, wherein, after the gimbal is folded, a part of the clamping member (400) is received on an inner circumferential side of a space encircled by the first arm (100) and the handle (300).

9. The gimbal according to claim 2, wherein the second connecting portion (210) is provided with a hinged portion (210A), the hinged portion (210A) is provided with a through hole (210B), the first rod portion (111) is provided with a groove, two sides of the groove are provided with sidewalls, and the hinged portion (210A) is arranged in the groove; a threaded member (14) is further comprised, the threaded member (14) passes through one of the sidewalls and the through hole (210B) on the hinged portion (210A) and is in threaded connection to the other sidewall, and the threaded member (14) is turned to enable the two sidewalls to clamp the hinged portion (210A).

10. The gimbal according to claim 9, wherein the hinged portion (210A) is provided with one of a projection (210C) and a concave hole, the sidewall of the groove is provided with the other of the projection (210C) and the concave hole, and the projection (210C) is accommodated in the concave hole.

11. The gimbal according to claim 1, wherein the clamping member (400) is provided with a first engaging portion (610), the first arm (100) is provided with a second engaging portion (620), and after the gimbal is folded, the first engaging portion (610) engages with the second engaging portion (620), so that the first arm (100), the second arm (200) and the clamping member (400) are interlocked and maintain fixed relative positions.

12. The gimbal according to claim 11, wherein the first engaging portion (610) is a groove body, the second engaging portion (620) is a convex block, and the convex block is inserted into the groove body.

13. The gimbal according to claim 12, wherein the first engaging portion (610) comprises at least a first sidewall (620A) and a second sidewall (620B), the second engaging portion (620) comprises at least a first groove surface (610A) and a second groove surface (610B), and when the first engaging portion (610) engages with the second engaging portion (620), the first sidewall (620A) abuts against the first groove surface (610A), and the second sidewall (620B) abuts against the second groove surface (610B).

14. The gimbal according to claim 11, wherein the handle (300) is provided with a third engaging portion (630), the third engaging portion (630) is a projection, the second engaging portion (620) is provided with a slot (620C), and when the handle (300) rotates with respect to the first arm (100), the third engaging portion (630) is stuck into the second engaging portion (620) so that the handle (300) and the first arm (100) are interlocked.

15. The gimbal according to claim 11, wherein the first arm (100) comprises a first connecting portion (100A) and a first rod portion (100B) fixedly connected to each other, the first connecting portion (100A) is connected to the handle (300), and the first rod portion (100B) is connected to the second arm (200).

16. The gimbal according to claim 15, wherein the second arm (200) is rotatably connected to one end of the first rod portion (100B) away from the first connecting portion (100A).

17. The gimbal according to claim 1, wherein the gimbal further comprises:
- a first locking component (810) configured to lock the clamping member (400) and the first arm (100) when the gimbal is in an unfolded state;
- a second locking component (820) configured to lock the second connecting portion (200A) and the second rod portion (200B) when the gimbal is in the unfolded state; and
- a third locking component (830) configured to lock the first arm (100) and the handle (300) when the gimbal is in the unfolded state;

wherein, when the gimbal is in the unfolded state, the handle (300), the first arm (100), the second connecting portion (200A), the second rod portion (200B) and the clamping member (400) are relatively fixed through the first locking component (810), the second locking component (820) and the third locking component (830).

18. The gimbal according to claim 17, wherein the first locking component (810) comprises a first locking pin (810A) and a first locking seat (810B) interlocked, the second locking component (820) comprises a second locking pin (820A) and a second locking seat (820B) interlocked, and the third locking component (830) comprises a third locking pin (830A) and a third locking seat (830B) interlocked.

19. The gimbal according to claim 18, wherein the first locking pin (810A) is arranged on one of the clamping member (400) and the second rod portion (200B), and the first locking seat (810B) is arranged on the other of the clamping member (400) and the second rod portion (200B).

20. The gimbal according to claim 18, wherein the second locking pin (820A) is arranged on one of the second rod portion (200B) and the second connecting portion (200A), and the second locking seat (820B) is arranged on the other of the second rod portion (200B) and the second connecting portion (200A).

* * * * *